United States Patent
Wallace et al.

(10) Patent No.: US 7,519,229 B2
(45) Date of Patent: Apr. 14, 2009

(54) VIDEO CODING SYSTEM PROVIDING SEPARATE CODING CHAINS FOR DYNAMICALLY SELECTED SMALL-SIZE OR FULL-SIZE PLAYBACK

(75) Inventors: Gregory Kent Wallace, Palo Alto, CA (US); Haitao Guo, San Jose, CA (US); Mitchell Oslick, Mountain View, CA (US)

(73) Assignee: Apple, Inc., Cupertino, CA (US)

( * ) Notice: Subject to any disclaimer, the term of this patent is extended or adjusted under 35 U.S.C. 154(b) by 1033 days.

(21) Appl. No.: 10/811,955

(22) Filed: Mar. 30, 2004

(65) Prior Publication Data

US 2005/0226513 A1    Oct. 13, 2005

(51) Int. Cl.
*G06K 9/36*    (2006.01)
(52) U.S. Cl. .................. 382/232; 382/233; 382/245; 382/246; 382/248; 382/240; 375/240.18; 375/240.01
(58) Field of Classification Search ................. 382/232, 382/233, 238, 240, 245, 246, 248, 250, 251; 375/240.18, 240.19, 240.01
See application file for complete search history.

(56) References Cited

U.S. PATENT DOCUMENTS

| | | |
|---|---|---|
| 2,905,756 A | 9/1959 | Graham |
| 4,245,248 A | 1/1981 | Netravali et al. |
| 4,399,461 A | 8/1983 | Powell |
| 4,717,956 A | 1/1988 | Morehead et al. |
| 4,853,775 A | 8/1989 | Rouvrais et al. |
| 5,001,559 A | 3/1991 | Gonzales et al. |
| 5,060,064 A | 10/1991 | Lamnabhi et al. |
| 5,081,532 A | 1/1992 | Rabii |
| 5,116,287 A | 5/1992 | Hironaka et al. |
| 5,196,933 A | 3/1993 | Henot |

(Continued)

FOREIGN PATENT DOCUMENTS

EP    0422404 A2    4/1991

(Continued)

OTHER PUBLICATIONS

Irani M. et al. "Video Compression Using Mosaic Representations" Signal Processing. Image Communication, Elsevier Science Publishers, Amsterdam, NL, vol. 7, No. 4, Nov. 1995, pp. 529-552, XP004047098 ISSN: 0923-5965.

(Continued)

*Primary Examiner*—Matthew C Bella
*Assistant Examiner*—Ali Bayat
(74) *Attorney, Agent, or Firm*—Kenyon & Kenyon LLP

(57) ABSTRACT

Embodiments of the present invention provide a coding system that codes data according to a pair of coding chains. A first coding chain generates coded video data that can be decoded by itself to represent a source video sequence of a small size, such as a size sufficient to support the real time playback and display features of a video editing application. The second coding chain generates coded video data representing supplementary data, which when decoded in conjunction with the coded video data of the first coding chain, yields the source video sequence for full-size display. The output of the first coding chain may be stored in memory in a file structure that can be accessed independently of the second chain's output and, therefore, it facilitates real time decoding and playback.

15 Claims, 5 Drawing Sheets

U.S. PATENT DOCUMENTS

| | | | |
|---|---|---|---|
| 5,225,904 | A | 7/1993 | Golin et al. |
| 5,473,376 | A | 12/1995 | Auyeung |
| 5,561,477 | A | 10/1996 | Polit |
| 5,600,375 | A | 2/1997 | Wickstrom |
| 5,699,119 | A | 12/1997 | Chung et al. |
| 5,737,022 | A | 4/1998 | Yamaguchi et al. |
| 5,764,296 | A | 6/1998 | Shin |
| 5,764,374 | A | 6/1998 | Seroussi et al. |
| 5,812,197 | A | 9/1998 | Chan et al. |
| 5,825,935 | A * | 10/1998 | Murakoshi .................. 382/248 |
| 5,974,197 | A | 10/1999 | Lee et al. |
| 5,990,963 | A * | 11/1999 | Mishima et al. ........ 375/240.24 |
| 6,005,622 | A | 12/1999 | Haskell et al. |
| 6,078,617 | A * | 6/2000 | Nakagawa et al. .......... 375/240 |
| 6,341,144 | B1 | 1/2002 | Haskell et al. |
| 6,556,625 | B2 * | 4/2003 | Haskell et al. ............ 375/240.2 |
| 2006/0062309 | A1 * | 3/2006 | Hoshi .................... 375/240.18 |

FOREIGN PATENT DOCUMENTS

| | | |
|---|---|---|
| EP | 0283715 A2 | 9/1998 |

OTHER PUBLICATIONS

Itoh Y et al. "Universal Variable Length Code for DCT Coding" Image Processing, 2000. Proceedings. 2000 International Conference on Sep. 10-13, 2000, pp. 940-943, XP010530771, ISBN: 0-7803-6297-7.

Jeong J et al. "Adaptive Huffman Coding of 2-D DCT Coefficients for Image Sequence Compression" Signal Processing. Image Communication, Elsevier Science Publishers, Amsterdam, NL, vol. 7, No. 1, Mar. 1995, pp. 1-11, XP004047118, ISSN: 0923-5965.

Mathew R et al. "Efficient Layered Video Coding Using Data Partitioning" Signal Processing. Image Communication, Elsevier Science Publishers, Amsterdam, NL, vol. 14, No. 9, Jul. 1999, pp. 761-782, XP004170655, ISSN: 0923-5965.

Rabbani M et al. "An Overview of the JPEG 2000 Still Image Compression Standard" Signal Processing. Image Communication, Elsevier Science Publishers, Amsterdam, NL, vol. 17, No. 1, Jan. 2002, pp. 3-48, XP004326797, ISSN: 0923-5965.

Sima M et al. "MPEG-Compliant Entropy Decoding on FPGA-Augmented TriMedia/CPU64" Field-Programmable Custom Computing Machines, 2002. Proceedings. 10th Annual IEEE Symposium On Apr. 22-24, 2002, Piscathaway, NJ, USA, IEEE, Apr. 22, 2002, pp. 261-270, XP010619852, ISBN: 0-7695-1801-X.

Haskell et al, *Digital Video: An Introduction to MPEG-2*, Chapter 9, pp. 183-229, Chapman & Hall, New York, New York, 1997.

International Organisation for Standardisation, ISO/IEC JTC 1/ SC 29/WG 11 N 3056, Information Technology—Coding of Audio-Visual Objects—Part 2: Visual : Amendment 1: Visual Extensions. Maui, Dec. 1999.

"Status and Direction of the MPEG-4 Standard", Atul Puri, AT&T Bell Laboratories, Holmdel, New Jersey, Multimedia Communications and Video Coding, 1996, Wang et al, Editors, pp. 349-356, Plenum Press, New York.

"Current and Future Trends in Multimedia Standards", Puri, et al, Multimedia Technology for Applications, 1998, Sheu et al, Editors, Chapter 1, pp. 3-35, IEEE Press Marketing, Piscataway, New Jersey.

Ploysongsang et al, DCT/DPCM Processing of NTSC Composite Video Signal IEEE Transactions on Communications, vol. Com-30, No. 3, Mar. 1982, USA, pp. 541-549.

"Improvements in DCT Based Video Coding", Puri et al, AT&T Laboratories, Visual Communications and Image Processing '97, Feb. 1997, San Jose, California, SPIE—The International Society for Optical Engineering, Bellingham, Washington.

"Invited Address: Video Coding Using the MPEG-1 Compression Standard", A. Puri, AT&T Bell Laboratories, Holmdel, New Jersey, 1992 SID International Symposium Digest of Technical Papers, May 1992, Society for Information Display, Playa del Rey, California pp. 123-126.

"Performance Evaluation of Nonscalable MPEG-2 Video Coding", Schmidt et al, AT&T Bell Laboratories, Holmdel, New Jersey, Visual Communications and Image Processing '94, Aggelos K. Katsaggelos Chair/Editor, Sep. 25-29, 1994, Chicago, Illinois, pp. 296-310, vol. 2308, Part One, SPIE—The International Society for Optical Engineering, Bellingham, Washington.

"Temporal Resolution Scalable Video Coding", Puri et al, AT&T Bell Laboratories, Holmdel, New Jersey, Proceedings, ICIP-94, Nov. 13-16, 1994, Austin, Texas, IEEE Computer Society Press, pp. 947-951, vol. II of III, Los Alamitos, California.

"SBASIC Video Coding and its 3D-DCT Extension for MPEG-4 Multimedia", Puri et al, AT&T Bell Laboratories, Holmdel, New Jersey, Visual Communications and Image Processing '96, Ansari et al Chairs/Editors, Mar. 17-20, 1996, Orlando, Florida, pp. 1331-1341, vol. 2727, Part Three, SPIE—The International Society for Optical Engineering, Bellingham, Washington.

"Video Coding Using the MPEG-2 Compression Standard", A. Puri, AT&T Bel Laboratories, Holmdel, New Jersey, Visual Communications and Image Processing '93, Haskell et al Chairs/Editors, Nov. 8-11, 1993, Cambridge, Massachusetts, pp. 1701-1713, vol. 2094, Part Three, SPIE—The International Society for Optical Engineering, Bellingham, Washington.

See et al, "Efficient Encoding of DC Coefficients in Transform Coding of Images Using JPEG Scheme", Signal Image and Video Processing, Jun. 11-14, 1991, vol. 1, No. Symp. 24, Institute of Electrical and Electronics Engineers, pp. 404-407, Singapore.

* cited by examiner

100

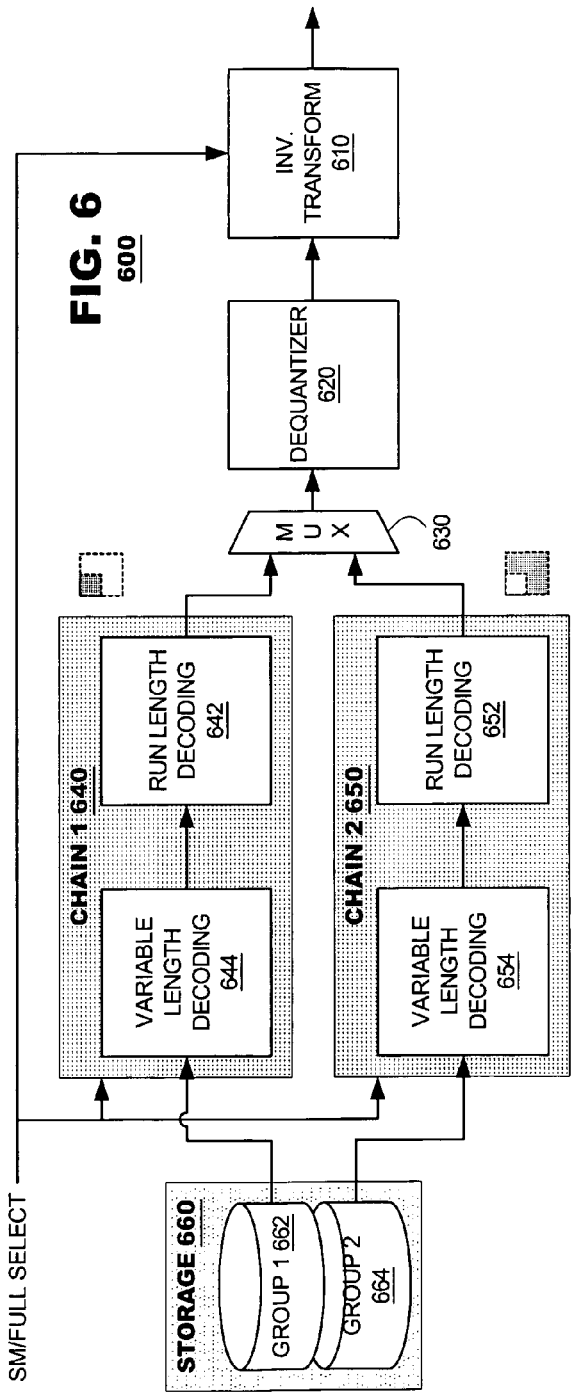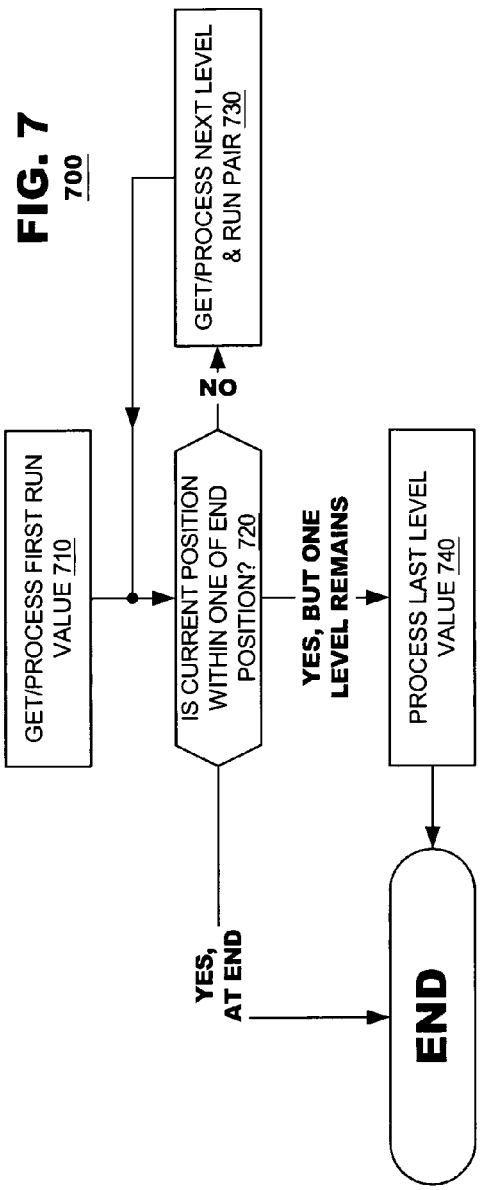

800

VIDEO CODING SYSTEM PROVIDING SEPARATE CODING CHAINS FOR DYNAMICALLY SELECTED SMALL-SIZE OR FULL-SIZE PLAYBACK

BACKGROUND

Embodiments of the present invention are directed to video coding systems that support playback of video at variably selected sizes. In particular, they are directed to video coding systems that support intra-frame coding schemes as those found in video editing applications.

Modern video editing applications are software based tools that permit an operator (an 'editor') to generate an output video sequence from a plurality of candidate input video sequences. Video editing applications are used to develop movie and television programming from a variety of different image sources. To capture a conversation between two characters in an interesting manner, for example, an editor may generate an output sequence that jumps among two or more different camera angles. The editor may select a first video sequence for an amount of time, then dissolve to a second video sequence for a second amount of time. To support this editing function, the video editor may provide a graphical user interface that represents the various candidate input sequences along a common time axis. The editor may specify cuts between the input streams that will occur in the output streams and also any effects (such as dissolves) that occur between them. These are draft editing settings that can be modified at will until final settings are obtained.

Video editing applications permit the editing settings to be tested at any time. The applications typically have access to coded video data representing each of the candidate input streams. The applications' graphical user interface also may provide a window that occupies some percentage of its display to permit playback of the editing settings. When playback is performed, the application may cause one or more of the stored video data sequences to be decoded and any effects to be applied before the resulting video sequence is displayed. Rendering displayable video sequences in real time display requires these decoding and effects operations to be performed once per frame interval (typically $\frac{1}{30}^{th}$ of a second). To render the decode operations as fast as possible, traditional video editing applications have accepted coded video data that is intra-predicted only. That is, each frame may be decoded without temporal prediction.

Designers of video editing applications may be compelled to accept a wider variety of coded video data, including data coded according to temporal prediction. To keep the decoding operations as fast as possible, the inventors determined that it would be advantageous to decode the input video data from its coding format and re-code the data according to an intra-prediction technique. Also the decoding and recoding is likely to result in less compression than the input data and, therefore, larger file sizes, it also is likely to result in faster decoding during the testing operation.

The inventors also realized that the decoding and re-coding of input data provide an opportunity to provide further optimizations to the decoding processes that are performed during the testing modes for video settings.

BRIEF DESCRIPTION OF THE FIGURES

FIG. 6 is a block diagram of a video decoding system according to an embodiment of the present invention.

FIG. 7 is a flow diagram of a run length consumption method according to an embodiment of the present invention.

DETAILED DESCRIPTION

Embodiments of the present invention provide a coding system that codes data according to a pair of coding chains. A first coding chain generates coded video data that can be decoded by itself to represent a source video sequence of a small size, such as a size sufficient to support the real time playback and display features of a video editing application. The second coding chain generates coded video data representing supplementary data, which when decoded in conjunction with the coded video data of the first coding chain, yields the source video sequence for full-size display. The output of the first coding chain may be stored in memory in a file structure that can be accessed independently of the second chain's output and, therefore, it facilitates real time decoding and playback.

Figure 1:
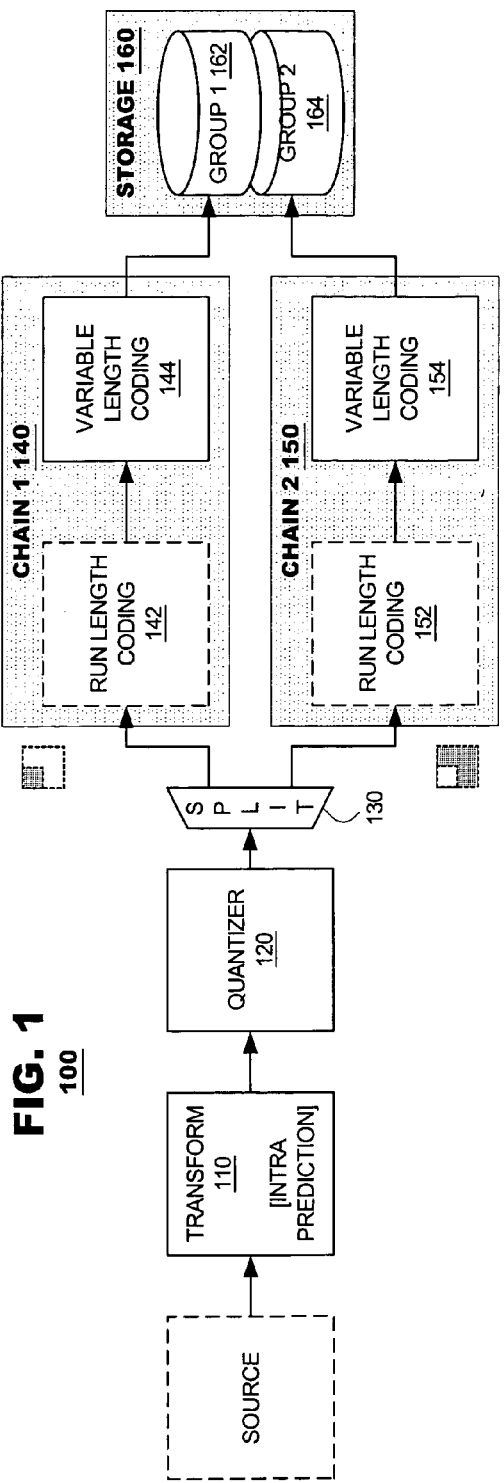
FIG. 1 is a block diagram of a video coding system according to an embodiment of the present invention.

FIG. 1 is a block diagram of a video coding system 100 according to an embodiment of the present invention. The video coding system 100 may accept data of a video sequence from some source, either a video capture device or from storage. Typically, image data of the video sequence is organized into frames, with each frame containing an array of pixels. The pixel data may be separated into luminance and a pair of chrominance components (Y, $C_r$, $C_b$), each of which may be processed by the system 100 independently.

The video coding system 100 may include a transform unit 110, a quantizer 120, a splitter 130 and a plurality of processing chains 140, 150. The processing chains each may contain respective run length coders 142, 152 and variable length coders 144, 156.

The transform circuit 110 transforms blocks of pixel data from a source frame to blocks of coefficient data according to a predetermined transform. For example, the transform unit 110 may operate according to a discrete cosine transform ("DCT"). Conventionally, DCT coefficients are described as being a two-dimensional array of coefficients. The most common implementation is to convert an 8 pixel by 8 pixel block of source data to an 8×8 array of DCT coefficients, such as the array shown in FIG. 2(a). One coefficient, which is considered to be at an origin of the array (position (0, 0)), represents a DC component of the block. Other coefficients represent components a various other frequencies throughout the block. Coefficients provided along major axes of the block respectively represent image components incrementally increasing frequencies in a single direction. Coefficients provided along a major diagonal of the block represent image components of the image at incrementally increasing frequencies in multiple directions.

The quantizer 120 truncates coefficients by dividing them by a quantization parameter ($q_p$). This reduces the magnitude of the coefficients that are used for subsequent coding operations. Some low level coefficients are truncated to zero. The quantization parameter may vary among blocks of a frame and among different frames. Thus, information regarding the quantization parameter itself may be included among the coded data output by the video coding system 100 so that, during decode operations, the quantization parameter may be reconstructed and the quantization operation may be inverted.

The splitter 130 represents a demultiplexing operation performed by the video coding system 100 to route coefficients of each block to one of a pair of coding chains 140, 150. According to an embodiment, for each block of coefficient data input to the splitter 130, the splitter 130 may forward a set of lower frequency coefficients to a first coding chain 140 and the remaining coefficients to the second coding chain 150. For example, to recover a displayable video signal at one quarter the size of the source image, it is sufficient to code one quarter of the lowest frequency coefficients together in the first coding chain (16 of the 64 coefficients generated for an 8×8 block) and code the remaining coefficients in the second coding chain. Other display sizes are permitted.

The coding chains 140 and 150 each may include a run length encoder 142, 152 and a variable length coder 144, 154. In an embodiment, the run length encoders 142, 152 each may perform run length coding according to a traditional zigzag scan direction. Starting from an origin, the run length coder traverses various coefficient positions and counts the number of positions that are traverse before the coder reaches a coefficient having a non-zero value. The number of traversed positions is output as a run length and the non-zero coefficient value is output as a level. The coder resumes traversing the block, outputting subsequent runs and levels until the scan traverses the entire block.

Of course, for the first chain 140, the run length coder 142 need only traverse the coefficients that are input to it. Using the example provided above, a one quarter sized display would yield a plurality of 4×4 blocks, such as the array shown in FIG. 2(b). A traditional zigzag scan is appropriate for such blocks.

Figure 2:
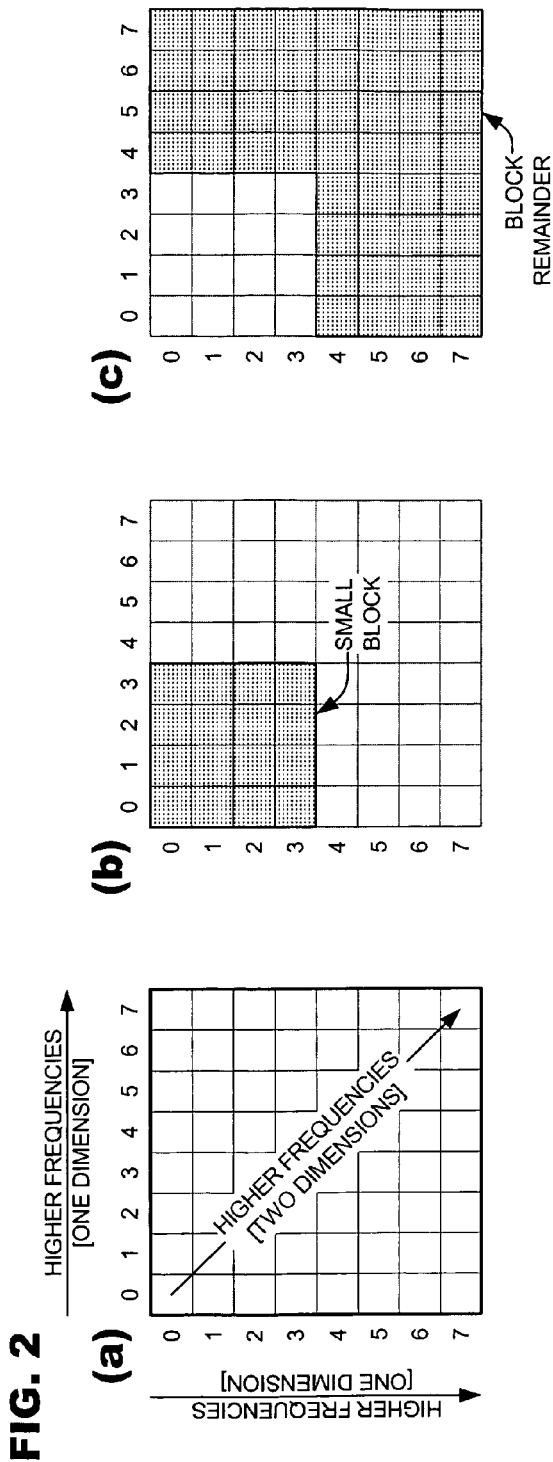
FIG. 2 illustrates block types according to an embodiment of the present invention.

For the second chain 150, the run length coder 152 traverses the remaining coefficients from the blocks, which typically are irregular arrays of coefficient values due to the absence of the coefficients that are passed instead to the first chain 140 (FIG. 2(c)). In one embodiment, it may be particularly efficient to treat the remaining coefficients as a regular array, providing dummy zero values in coefficient positions that ordinarily would have been occupied by coefficients of the small block. Thus, the run length coder 152 may perform a traditional zigzag scan across the block. Because, for relatively flat image content (low texture), coefficients along the main diagonal of the block far from the origin tend to have zero values, this run length coding may be particularly efficient.

Alternatively, the run length encoder 152 may traverse the remainder block according to a traditional zig-zag scan in a manner that skips over coefficient positions that are passed to the first chain 140. Referring again to FIG. 2(c), for example, rather than start at position (0,0), the run length coder 152 may start at position (4,0). The next 'adjacent' position in the zig-zag scan direction would be position (0,4) because coefficient positions (3,1), (2,2) and (1,3) are not members of the block remainder. A next zig-zag span, from positions (0,5) to (5,0) similarly skips over coefficient positions (3,2) and (2,3) because they also are members of the small block in this embodiment.

In a further embodiment, the block remainder may be parsed into sub-blocks for independent run length encoding according to a zig-zag scan direction. In the embodiment of FIG. 2(c), for example, the blocks may be parsed into three 4×4 arrays of coefficient data, each of which are run length coded individually.

According to another embodiment of the present invention, a variable length coder may perform coding according to one of a plurality of reversible coding algorithms. A reversible coding algorithm permits direct decoding of VLC data to run length data by a direct computation rather than reference to some look up table. Direct computation of the source data provides for faster real-time decoding than a look up table, particularly in software implementations of a decoder. By way of example, the variable length coders may operate according to the family of Golomb-Rice codes or exp-Golomb codes, among others.

The variable length coders 144, 154 of the two chains 140, 150 may code the run, level pair data output from the run length encoders 142, 152. In still another embodiment, the run length coding 142, 152 of the processing chains 140, 150 may be omitted altogether. In this embodiment, the variable length encoders 144, 154 may operate directly on the coefficient data output from the splitter 130. For this reason, the run length coders 142, 152 are illustrated in FIG. 1 in phantom.

Coded video data of each frame may be stored in a file 160 in a storage device. According to an embodiment, the coded video data output from the first processing chain 140 may be stored in a contiguous area of the file for easy access (shown as group 1 162). The coded video data output from the second processing chain 150 may be stored in another area 164 of the file 160. During playback, if it is desired to generate only a small sized video sequence, the coded video data of group 1 162 may be retrieved and decoded. Alternatively, if it is desired to decode a full-sized video sequence, both groups 162,164 may be retrieved and decoded. Accordingly, the present invention facilitates real time playback of images of various sizes.

According to an embodiment, all frames may be coded as intra-coded frames ("I frames"). Intra-coding permits video data of one block in a frame to be coded from video data of another block in the frame. Thus, video content of a given block X may be coded from data of a block horizontally or vertically adjacent to block X. For example, the techniques described the MPEG-4 standard, sec 7.4.3 may be applied in the present coder 100. See, Information technology—Coding of audio-visual objects—Part 2: Visual Amendment 1: Visual extensions, ISO/IEC JTC 1/SC 29/WG 11 N 3056 (2000). For ease of illustration, such operations may be considered subsumed in the transform block 110.

Figure 3:
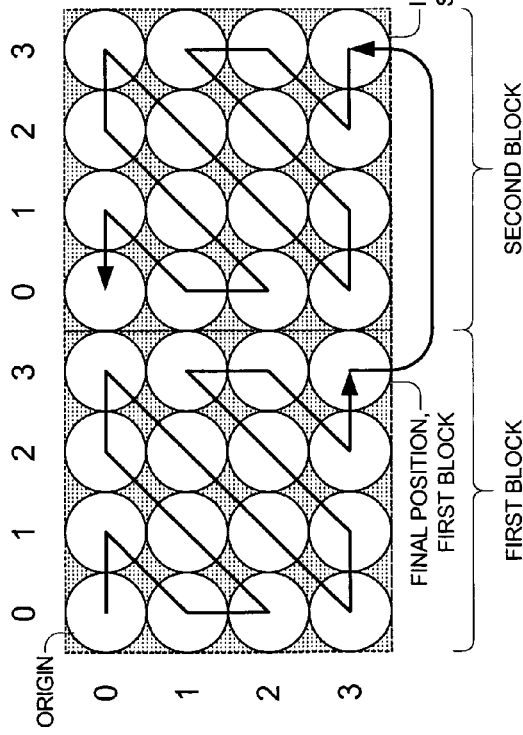
FIG. 3 illustrates a scan direction for a run length encoder according to an embodiment of the present invention.

According to an embodiment, the run length encoder 142 may operate according to a modified zigzag scan across a pair of small blocks. FIG. 3 illustrates a zigzag scan across an exemplary pair of 4×4 blocks of coefficient data. According to an embodiment, the scan may start at an origin of a first block and proceed across coefficient positions within the first block according to a traditional zigzag scan direction. The scan traverses the block in a direction perpendicular to a main diagonal of the block (compare to FIG. 2(a)) until it reaches a final coefficient position. The final coefficient position typically is on the main diagonal of the sub-block as far from the origin as possible. From this final position in the first block, the scan direction may jump to a corresponding position on the second block, labeled the "initial position" in FIG. 3. The scan direction traverses coefficient positions of the second block in an inverse scan direction. It works from the initial position to the origin of the second block along a direct that is perpendicular to the main diagonal of the block. Thus, the zigzag scan of the present embodiment consumes two small blocks for each iteration of the scan.

The embodiment of FIG. 3 can be particularly efficient for coding coefficients of the small blocks. Since the small blocks typically contain a small number of coefficients as compared to a full size block (for example, 16 coefficients as opposed to 64 coefficients), a conventional zigzag scan, which traverses only a single block, is likely to encounter relatively short runs of zeroes which are inefficient. Longer runs of zeroes are likely to be encountered, however, by appending a traditional zigzag scan of a first block with an inverse ordered zigzag scan of a second block. For flat image data, coefficients closer to the final position of the first block and the initial position of the second block are likely to be zero. These zeroes may be captured by a run that 'jumps' from the first block to the second block.

Figure 4:
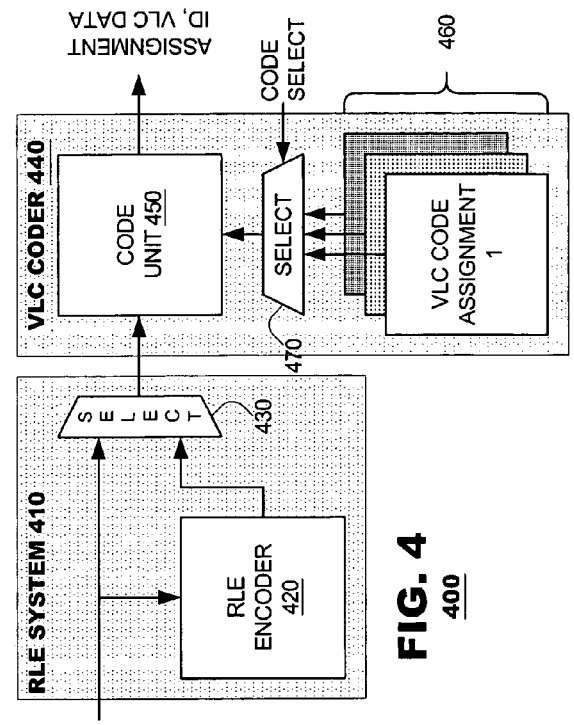
FIG. 4 illustrates a variable length coder according to an embodiment of the present invention.

FIG. 4 is a block diagram of a coding chain 400 according to another embodiment of the present invention. The coding chain 400 may find application as the first or the second coding chains illustrated in FIG. 1. FIG. 4 illustrates a multi-mode run length encoding system 410 which includes a run length encoder 420 and a selector 430. The selector 430 may include a pair of inputs. The first input is coupled to an input to the coding chain and the second input is coupled to an output of the run length encoding system 410. An input of the run length encoder 420 also may be coupled to an input of the run length encoding system 410. Based on a selection signal (labeled "RLE select" in FIG. 4), the selector 430 may pass data from a selected one of its input for further processing by the variable length coder.

In another embodiment, the coding algorithm to be applied to data may change dynamically according to different data patterns that are input to a variable length coder 440. The variable length coder 440 is shown as including a coding unit 450 and a plurality of coding assignment tables 460. Responsive to a selection input, a VLC selector 470 may couple one of the assignment tables to the coding unit 450. The selection input may change dynamically, for example, on a block-by-block basis, a tile-by-tile basis or on a frame-by-frame basis. The VLC selection signal may be based on the block's type (e.g., carrying luminance data vs. chrominance data), based upon the coding chain to which the variable length coder belongs (chain 140 or 150), or based on a tile to which the block belongs. Additionally, a block may be coded by several VLC assignments to permit a compression efficiency comparison to be made between them. The coding results that achieve the highest compression could be used for storage.

During coding, even if it uses a reversible coding algorithm, the variable length coder 500 may code input data by either direct calculation or through resort to a look up table.

Figure 5:
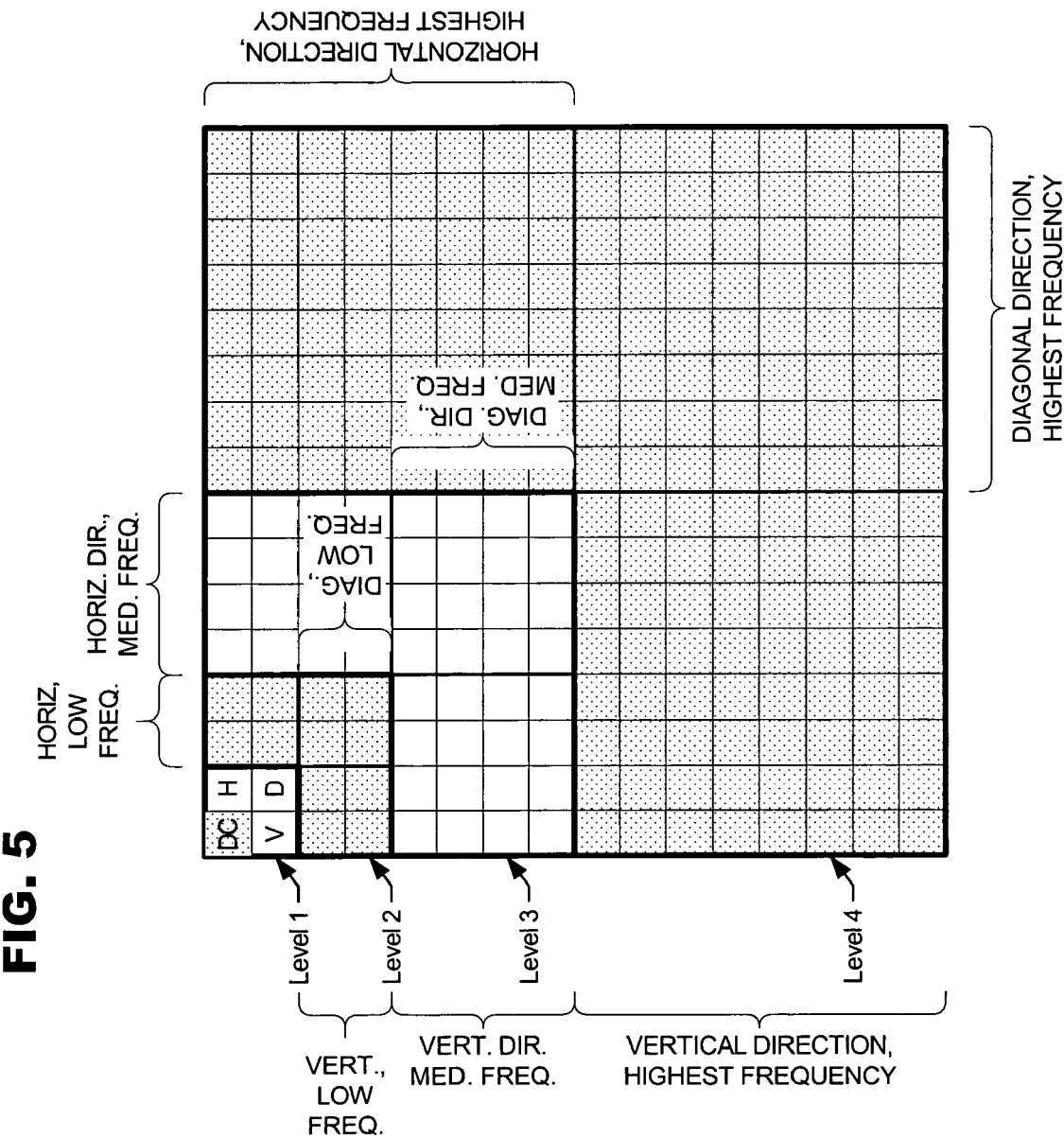
FIG. 5 illustrates block types according to an embodiment of the present invention implementing coding by wavelet coefficients.

In an alternate embodiment, the transform unit 110 may operate according to a wavelet transform. Multi-resolution wavelet decomposition is one of the most efficient schemes for coding image information. Image information to be coded is represented as a linear combination of locally supported wavelets. An array of wavelet coefficients is shown in FIG. 5. Wavelet decomposition may result in a DC coefficient (labeled "DC") and several levels of coefficients corresponding to wavelet bands extending horizontally, vertically and diagonally across a given tile. In FIG. 5, four levels of coefficients are illustrated (levels 1-4). A first level includes coefficients of extremely low frequency bands. Each wavelet in level 2 divides the area of the tile into quarters. Thus, there are four horizontal wavelet coefficients, four vertical wavelet coefficients and four diagonal wavelet coefficients. In each additional level, the coefficients represent wavelets having one quarter of the area of a corresponding wavelet in a prior level of coefficients. In FIG. 5, the array illustrates wavelet coefficients for four different levels within a tile, although the number of levels may be tailored for a given coding application.

The principles of the present invention may be extended to a wavelet-based coder. Such a coder may include a coding chain for each level or band of wavelet coefficients that appear in a tile. The transform unit 110 may generate wavelet coefficients, which are truncated by the quantizer 120. A splitter 130 may route wavelet coefficients of each level or of each band of coefficients to respective first coding chains 140, 150, etc., for further coding. Alternatively, the coder 100 may include only a pair of coding chains: a first coding chain 140 dedicated to a set of tile coefficients and/or levels that are necessary to reconstruct a small image and a second coding chain dedicated to remaining sets of coefficients from the tile that are to be used to reconstruct a full size image. In either embodiment, coded coefficients of each coding chain may be stored separately for fast retrieval during decoding.

FIG. 6 is a block diagram of a video decoder 600 according to an embodiment of the present invention. The decoder 600 may invert coding operations applied by the coder 100 of FIG. 1. Accordingly, the decoder may include an inverse transform unit 610, a dequantizer 620, a multiplexer 630, a pair of processing chains 640, 650 each including a run length decoder 642, 652 and a variable length decoder 644, 654, and a storage unit 660. As described, the coded video data may be present in a file in storage 660 in two distinct groups. A first group may contain the coded data of the small blocks, which may be decoded independently to obtain a small-sized replica of the source video image. The second group may contain coded data of the block remainders, which may be decoded in conjunction with the coded data of the small blocks, to generate a full sized image.

During operation, one or both of the processing chains 640, 650 will be active. If only the first processing chain 640 is active, coded video data of the small blocks may be retrieved from storage, variable length decoded 644 and run length decoded 642. If the second processing chain 650 is active, coded video data of the block remainders also may be retrieved from storage, variable length decoded 654 and run length decoded 652. If the multiplexer 630 receives data from both processing chains 640, 650, it merges the data together in a format for further processing by the dequantizer 620 and inverse transform unit 610.

The dequantizer 620 recovers transform values by multiplying the input coefficient values by the quantizer parameter ($q_p$) that was applied by the quantizer 120 of FIG. 1. The inverse transform unit 610 recovers pixel values by inverting the transform (e.g., discrete cosine transform coding or wavelet coding) that had been applied by the transform unit 110 of FIG. 1. Thus, the transform unit outputs blocks of pixel data which may be reconstituted with other blocks for display. As noted, the recovered image data may be a small sized image if only the small sized blocks are decoded or it may be a full-sized image of all coded video data of the frame is decoded.

In an embodiment, the operation of the inverse transform unit 610 and the dequantizer 620 may receive an indicator of a decoding mode that is in use. When full size decoding is performed, these units 610, 620 may operate in a conventional manner. When small size decoding is performed, however, the inverse transform unit 610 may omit transform calculations that refer solely to coefficients that occur in the remainder block—coefficients that would be output from the second processing chain 650. Since the chain 650 is rendered inactive by the selection signal, the transform calculations would perform no useful work. Omitting such calculations optimizes throughput of the inverse transform unit 610. Similarly, the dequantizer 620 need not scale any omitted coefficient by a quantizer parameter, since it also does not perform useful work (e.g., coefficient×$q_p$=0, whenever coefficient=0).

The inverse transform unit 610 may be a wavelet transform unit to generate pixel data from wavelet coefficients. In such an embodiment, when the inverse transform unit operates on only small blocks, a traditional wavelet decode would generate full-size video at reduced resolution due to the absence of the high frequency coefficients. In one embodiment, the decoder may re-size the full-size video to a correspondingly smaller size (e.g., down to 25% of the original).

As illustrated in Table 1 below, run length coded data is represented as series of run level pairs. A run value represents a number of consecutive coefficient scan positions at which zero valued coefficients are detected. A run value may have any value between zero and the maximum number of coefficient positions in the data unit (e.g., 64 for an 8×8 block or 32 for a coded pair of 4×4 blocks). A level value represents the value of the next non-zero coefficient encountered along the scan direction. Thus, to code coefficients of a single block or a block pair, a run length encoder will generate at least one run and perhaps a series of levels and runs as dictated by the information content of the block. Coding of a block may conclude at a run or a level value.

Typically, it is convenient to consider the run and level values as associated pairs:

TABLE 1

|  | Pair | | | | |
| --- | --- | --- | --- | --- | --- |
|  | 1 | 2 | 3 | 4 | ... | n |
| Pattern | R, L | R, L | R, L | R, L | ... | R, L |

The pairs may be VLC coded as a number of symbols. If a run value of the final pair consumes the remainder of a given block, then a unique end-of-block character may be inserted in a final level position to complete the final symbol and permit the VLC coding to conclude. For good compression, however, unless the symbols (the run/level pairs) exhibit some pattern, an arbitrary code word table must be used which requires a table lookup during decoding. Table lookups are slow processes, which can impair decoder performance.

According to an embodiment of the present invention, efficient decoding of the data of Table 1 may be achieved by coding each run value and each level value as individual symbols (instead of the run, level pairs described above). Such an embodiment provides opportunities to optimize VLC consumption algorithms. According to an embodiment, the consumption method may consider a "pattern" of coded run and level values as shown in Table 2.

TABLE 2

|  | Pair | | | | |
| --- | --- | --- | --- | --- | --- |
|  | 1 | 3 | 3 | ... | n − 1 | n |
| Pattern | R | L, R | L, R | L, R | ... | L, R | L |

FIG. 7 illustrates a consumption method 700 according to an embodiment of the present invention. According to the embodiment, the method reads and 'consumes' a first run value present in the input pattern of run length pairs (box 710). The method then determines if the current coefficient position, identified by the sum of the run values and number of level values so far consumed, is within 1 position of the end position (box 720). If not, the method reads and consumes a pair of level and run values (box 730). Each run and level value may be decoded as separate symbols even though they are read as a pair. The method then may return to box 720 for another iteration. If the current coefficient position is at the end position, the method 700 simply may terminate. If the current position is next to the end position, the method may consume a final level value (box 740) before terminating.

The consumption operation set forth in FIG. 7 consumes run, level pairs according to the pattern shown in Table 2. This consumption pattern is faster than a consumption method that would occur if a VLC decoder read each coded run and level value singly and tested for an end position condition at the end of every read. The embodiment of FIG. 7 requires one fewer test per level/run pair.

Thus, as shown above, the coding schemes of the present embodiments organize coded video data according to a protocol that provide for very fast decoding of reduced-sized images, which is particularly suitable for video editing applications. The foregoing description provides examples of 4×4 blocks, which lead to a quarter-sized display when decoded. Of course, the principles of the present invention are not so limited. Operation of the decoding system may be tailored to provide any ratio of small display vs. full sized display that is desired. For the size ratios shown in Table 3, the splitter 130 may assemble sub-blocks directly from source 8×8 blocks having the dimensions shown in the table.

TABLE 3

| SIZE RATIO | SMALL BLOCK SIZE |
| --- | --- |
| 6% | 2 × 2 |
| 14% | 3 × 3 |
| 25% | 4 × 4 |
| 39% | 5 × 5 |
| 56% | 6 × 6 |
| 77% | 7 × 7 |

If other size ratios are desired, for example 50%, additional spatial resizing techniques may be employed on decoded video data once it is output from the decoder (FIG. 6).

Additionally, to provide additional flexibility, video coders and decoders may be provided with three or more coding/decoding chains, each of which is devoted to processing video data associated with a predetermined frame size. Using a video coder as an example, a first coding chain may process 3×3 arrays of extracted DCT coefficients a second coding chain may process remaining coefficients up to a 5×5 coefficient array (a 5×5 array having the coefficients of the 3×3 array removes) and a third coding chain may process coefficients that remain following extraction by the first two coding chains. Similarly, video decoders may possess multiple coding chains in an analogous manner.

The systems and techniques described in the foregoing embodiments may be integrated into larger video coding systems to provide full coding services. One such system codes video frames as a plurality of 'tiles.' The spatial area of a frame is organized into discrete sections, called tiles, and certain coding decisions for blocks that occur within the tiles may be made on a tile-by-tile basis rather than a block-by-block basis. For example, the selection of a VLC table (FIG. 4) may be made universally for all blocks in a given tile. Additionally, coding parameters such as the selection of a quantizer parameter may be made universally for all blocks therein. By organizing coding decisions on a tile-by-tile basis, it permits video data of a tile to be coded or decoded independently of video data belonging to another tile in the same frame. This provides several advantages, including (1) tiles may be assigned to independent processors for parallel coding or decoding, (2) memory and cache management is made easier by dividing video data of a frame into the smaller tiles, (3) higher compression may be achieved because coding parameters may be selected independently (and therefore, optimized) for each tile, and (4) tiles of interest in a video sequence may be decoded without requiring decoding of the frames to which they belong. Thus, the video coder of FIG. 1 and the video decoder of FIG. 6 may be replicated among parallel processing systems to decode tiles independently.

Figure 8:
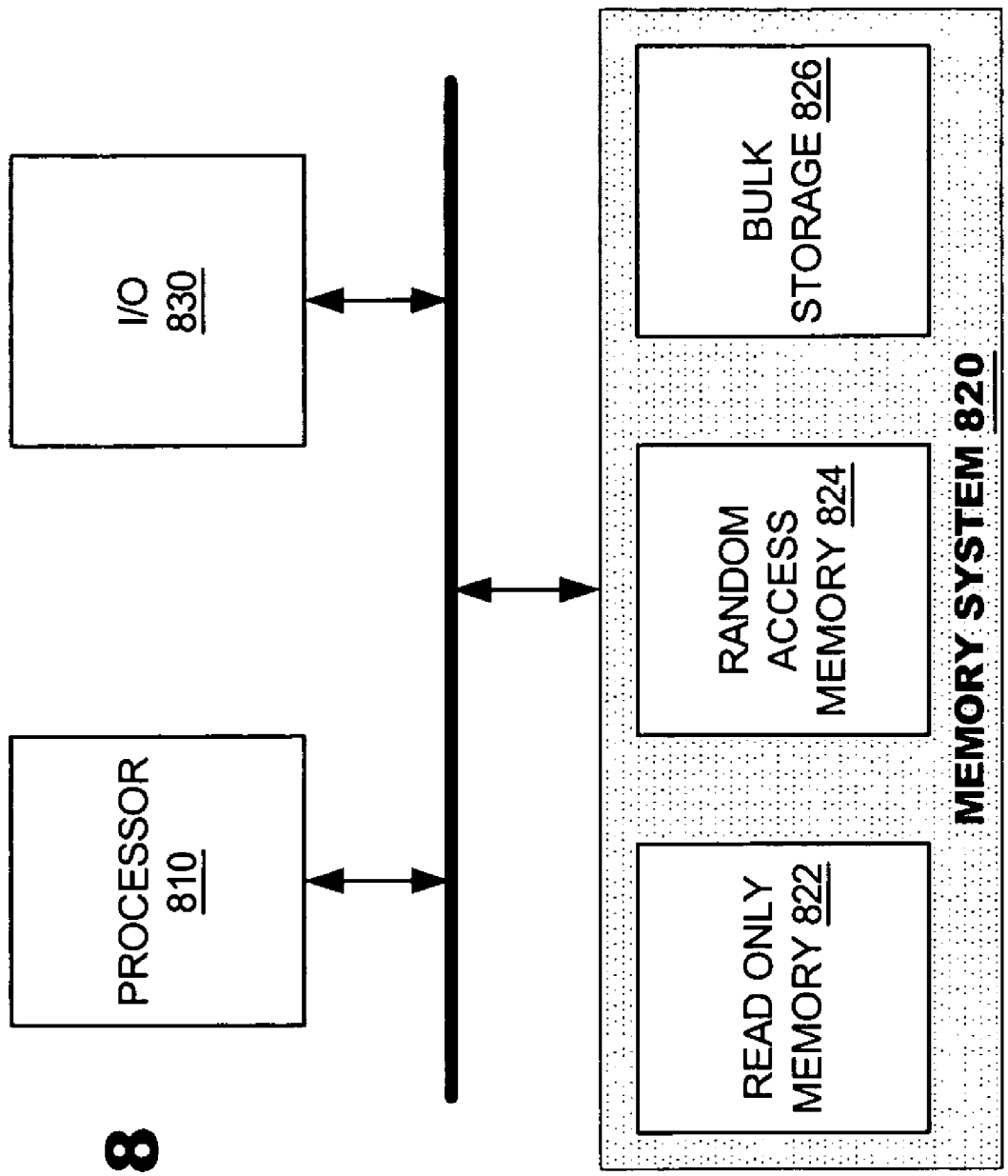
FIG. 8 is a simplified block diagram of a processing system.

The foregoing embodiments may be provided a software-implemented system. As such, these embodiments may be represented by program instructions that are to be executed by a server or other common computing platform. One such platform 800 is illustrated in the simplified block diagram of FIG. 8. There, the platform 800 is shown as being populated by a processor 810, a memory system 820 and an input/output (I/O) unit 830. The processor 810 may be any of a plurality of conventional processing systems, including microprocessors, digital signal processors and field programmable logic arrays. In some applications, it may be advantageous to provide multiple processors (not shown) in the platform 800. The processor(s) 810 execute program instructions stored in the memory system. The memory system 820 may include any combination of conventional memory circuits, including electrical, magnetic or optical memory systems. As shown in FIG. 8, the memory system may include read only memories 822, random access memories 824 and bulk storage 826. The memory system not only stores the program instructions representing the various methods described herein but also can store the data items on which these methods operate. The I/O unit 830 would permit communication with external devices (not shown).

Several embodiments of the present invention are specifically illustrated and described herein. However, it will be appreciated that modifications and variations of the present invention are covered by the above teachings and within the purview of the appended claims without departing from the spirit and intended scope of the invention.

We claim

1. A video coding method, comprising:
    organizing each frame of input video into a plurality of blocks of pixels,
    for each block:
        coding the block as a plurality of coefficients according to a predetermined transform,
        quantizing the block of coefficients according to a quantization parameter,
        extracting a sub-set of coefficients;
    coding a pair of sub-sets according to run length coding and storing the result therefrom in a first file, wherein the run length coding of the pair of sub-sets is done according to a scan direction that:
        progresses across a first sub-set of the pair in a zig-zag from a lowest frequency coefficient to a highest frequency coefficient therein,
        advances to a highest frequency coefficient of a second sub-set of the pair, and
        progresses across the second sub-set in a zig-zag from the highest frequency coefficient to a lowest frequency coefficient therein,
    coding the remaining coefficients according to run length coding and storing the results therefrom in a second file separate from the first file.

2. The video coding method of claim 1, wherein the transform is a discrete cosine transform.

3. The video coding method of claim 1, wherein the transform is wavelet decomposition.

4. The video coding method of claim 1, further comprising for at least one block, predicting image data of the block from a neighboring block.

5. The video coding method of claim 1, wherein each frame in a video sequence is coded as an intra coded frame.

6. The video coding method of claim 1, wherein the input video data is obtained from a video capture device.

7. The video coding method of claim 1, wherein the input video data is obtained from decoding of predictively coded data.

8. A computer readable storage medium having stored thereon two files containing coded video data generated from a process, the process comprising:
    organizing each frame of input video into a plurality of blocks of pixels,
    for each block:
        coding the block as a plurality of coefficients according to a predetermined transform,
        quantizing the block of coefficients according to a quantization parameter,
        extracting a sub-set of coefficients;
    coding pair of sub-sets according to run length coding using a scan direction that:
        progresses across a first sub-set of the pair in a zig-zag from a lowest frequency coefficient to a highest frequency coefficient therein,
        advances to a highest frequency coefficient of a second sub-set of the pair, and
        progresses across the second sub-set in a zig-zag from the highest frequency coefficient to a lowest frequency coefficient therein,
    coding the remaining coefficients according to run length coding,
    wherein the coded data representing the extracted coefficients are stored in a first file on the computer readable storage medium to be accessed separately from a second file stored on the computer readable storage medium storing the coded data representing the remaining coefficients.

9. The medium of claim 8, wherein the coded data representing the extracted coefficients of multiple frames from a video sequence are stored together on a first portion of the computer readable storage medium, and the coded data representing the remaining coefficients are stored on a second portion thereof.

10. A computer readable storage medium storing program instructions that when executed cause an executing device to perform the method comprising:
    organizing each frame of input video into a plurality of blocks of pixels,
    for each block:
        coding the block as a plurality of coefficients according to a predetermined transform,
        quantizing the block of coefficients according to a quantization parameter,
        extracting a sub-set of coefficients;
    coding a pair of sub-sets according to run length coding and storing the result therefrom in a first portion of storage, wherein the run length coding of the pair of sub-sets is done according to a scan direction that:
        progresses across a first sub-set of the pair in a zig-zag from a lowest frequency coefficient to a highest frequency coefficient therein, advances to a highest frequency coefficient of a second sub-set of the pair, and progresses across the second sub-set in a zig-zag from the highest frequency coefficient to a lowest frequency coefficient therein, coding the remaining coefficients according to run length coding and storing the results therefrom in a second portion of storage separate from the first portion.

11. The medium of claim 10, wherein the coded data representing the extracted coefficients of multiple frames from a video sequence are stored together on a first portion of the storage, and the coded data representing the remaining coefficients are stored on a second portion thereof.

12. A video coding method, comprising:

organizing each frame of input video into a plurality of blocks of pixels, for each block:

coding the block as a plurality of coefficients according to a predetermined transform, quantizing the block of coefficients according to a quantization parameter;

coding a pair of blocks according to run length coding using a scan direction that:

progresses across a first block of the pair in a zig-zag from a lowest frequency coefficient to a highest frequency coefficient therein, advances to a highest frequency coefficient of a second block of the pair, and progresses across the second block in a zig-zag from the highest frequency coefficient to a lowest frequency coefficient therein.

13. The video coding method of claim 12, wherein the transform is a discrete cosine transform.

14. The video coding method of claim 12, wherein the transform is wavelet decomposition.

15. A computer readable storage medium storing program instructions that when executed cause an executing device to perform the method comprising:

organizing each frame of input video into a plurality of blocks of pixels, for each block:

coding the block as a plurality of coefficients according to a predetermined transform, quantizing the block of coefficients according to a quantization parameter;

run length encoding a pair of blocks according to a scan direction that:

progresses across a first block of the pair ma zigzag from a lowest frequency coefficient to a highest frequency coefficient therein, advances to a highest frequency coefficient of a second block of the pair, and progresses across the second block in a zig-zag from the highest frequency coefficient to a lowest frequency coefficient therein.

* * * * *